United States Patent
Lee et al.

(10) Patent No.: US 10,488,985 B2
(45) Date of Patent: Nov. 26, 2019

(54) TOUCH SENSOR CONTROLLER

(71) Applicant: SAMSUNG ELECTRONICS CO., LTD., Suwon-si (KR)

(72) Inventors: Jin Chul Lee, Seoul (KR); Choong Hoon Lee, Seoul (KR); Yoon Kyung Choi, Seoul (KR); Cha Dong Kim, Gwacheon-si (KR); Jun Chul Park, Daegu (KR); Dong Wook Lim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 258 days.

(21) Appl. No.: 15/660,330

(22) Filed: Jul. 26, 2017

(65) Prior Publication Data

US 2018/0121019 A1    May 3, 2018

(30) Foreign Application Priority Data

Nov. 2, 2016    (KR) .................. 10-2016-0145099

(51) Int. Cl.
    *G06F 3/041*    (2006.01)
    *G06F 3/044*    (2006.01)

(52) U.S. Cl.
    CPC ............ *G06F 3/0418* (2013.01); *G06F 3/044* (2013.01)

(58) Field of Classification Search
    CPC .................................. G06F 3/041; G06F 3/044
    See application file for complete search history.

(56) References Cited

U.S. PATENT DOCUMENTS

| 8,970,227 B2 | 3/2015 | Nys et al. |
| 2015/0145535 A1 | 5/2015 | Nys et al. |
| 2015/0220170 A1* | 8/2015 | Nam ............... G06F 3/0418 345/173 |
| 2016/0018867 A1 | 1/2016 | Nys et al. |
| 2016/0070381 A1* | 3/2016 | Park ............... G06F 3/044 327/306 |
| 2016/0124544 A1* | 5/2016 | Kang ............... G06F 3/044 345/174 |

FOREIGN PATENT DOCUMENTS

| KR | 101297595 B1 | 8/2013 |
| KR | 1020140021222 A | 2/2014 |
| KR | 1020150103952 A | 9/2015 |
| KR | 101567587 B1 | 11/2015 |
| WO | 2012034714 A1 | 3/2012 |

\* cited by examiner

*Primary Examiner* — Andrew Sasinowski
(74) *Attorney, Agent, or Firm* — Sughrue Mion, PLLC (57) ABSTRACT

A touch sensor controller may include a transmitter configured to output a driving signal to sensor lines of a touch panel, a charge amplifier configured to generate and output a voltage signal by using a charge generated in the sensor lines, a sampling circuit including a first sampler and a second sampler for detecting the voltage signal, and a logic circuit configured to determine whether the transmitter is operating according to a magnitude of a noise signal included in the voltage signal, and, in response to an operation of the transmitter being interrupted, control one of the first sampler and the second sampler to sample the voltage signal according to a sign of the noise signal.

13 Claims, 12 Drawing Sheets

ABKGROUND PLACEHOLDER —

TOUCH SENSOR CONTROLLER

CROSS-REFERENCE TO RELATED APPLICATION

This application claims priority from Korean Patent Application No. 10-2016-0145099, filed on Nov. 2, 2016 in the Korean Intellectual Property Office, the disclosure of which is incorporated herein by reference in its entirety.

BACKGROUND

1. Field

Apparatuses and methods consistent with exemplary embodiments relate to a touch sensor controller.

2. Description of Related Art

A touch sensor controller is connected to a touch panel attached to the front of a display device to detect a touch input of a user. The applications of touchscreen devices including touch panels and touch sensor controllers have expanded from mobile devices, such as smartphones, tablet personal computers (PCs), laptop computers, and the like, to desktop PCs, televisions, vehicles, and the like. In recent years, various methods have been proposed to remove the influence of a noise signal input externally so as to allow a touchscreen device to accurately detect a touch input made thereto.

SUMMARY

One or more exemplary embodiments provide a touch sensor controller for detecting a touch input using a noise signal entering a touch panel.

According to an aspect of an exemplary embodiment, a touch sensor controller may include a transmitter configured to input a driving signal to sensor lines of a touch panel, a charge amplifier configured to generate and output a voltage signal by using a charge generated in the sensor lines, a sampling circuit including a first sampler and a second sampler for detecting the voltage signal, and a logic circuit configured to determine whether the transmitter is operating according to a magnitude of a noise signal included in the voltage signal, and, based on an operation of the transmitter being interrupted (i.e., the driving signal is no longer transmitted to the sensor lines of the touch panel), control one of the first sampler and the second sampler to sample the voltage signal according to a sign of the noise signal.

According to an aspect of an exemplary embodiment, a touch sensor controller may include an analog circuit and a logic circuit. The analog circuit may include a transmitter configured to output a driving signal to sensor lines of a touch panel, and a receiver configured to detect a charge generated in the sensor lines to generate an analog signal. The logic circuit may be configured to operate the analog circuit in one of a normal mode and a noise mode according to a magnitude of a noise signal introduced into the sensor lines, control the receiver to detect the charge of the sensor lines using a mutual-capacitance method in the normal mode, and control the receiver to detect the charge of the sensor lines using a self-capacitance method in the noise mode.

According to an aspect of an exemplary embodiment, a touch sensor controller may include a transmitter configured to output a driving signal to sensor lines of a touch panel, and a receiver configured to detect a charge generated in the sensor lines by a touch input to generate an analog signal. When a magnitude of a noise signal introduced into the sensor lines is greater than a predetermined reference value, the transmitter may stop outputting the driving signal, and the receiver may detect the noise signal and the charge generated in the sensor lines by the touch input to generate the analog signal.

BRIEF DESCRIPTION OF DRAWINGS

The above and other aspects, features and other advantages of the present inventive concept will be more clearly understood from the following detailed description, taken in conjunction with the accompanying drawings, in which.

DETAILED DESCRIPTION

Exemplary embodiments will now be described in detail with reference to the accompanying drawings.

Figure 1:
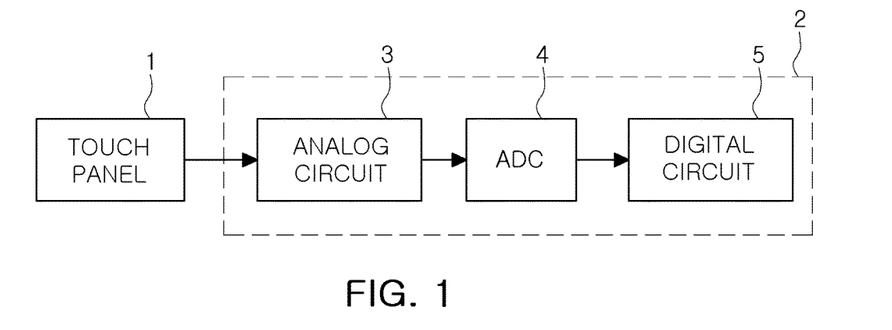
FIGS. 1 and 2 are block diagrams illustrating a touchscreen device including a touch sensor controller according to an exemplary embodiment.
Figure 2:
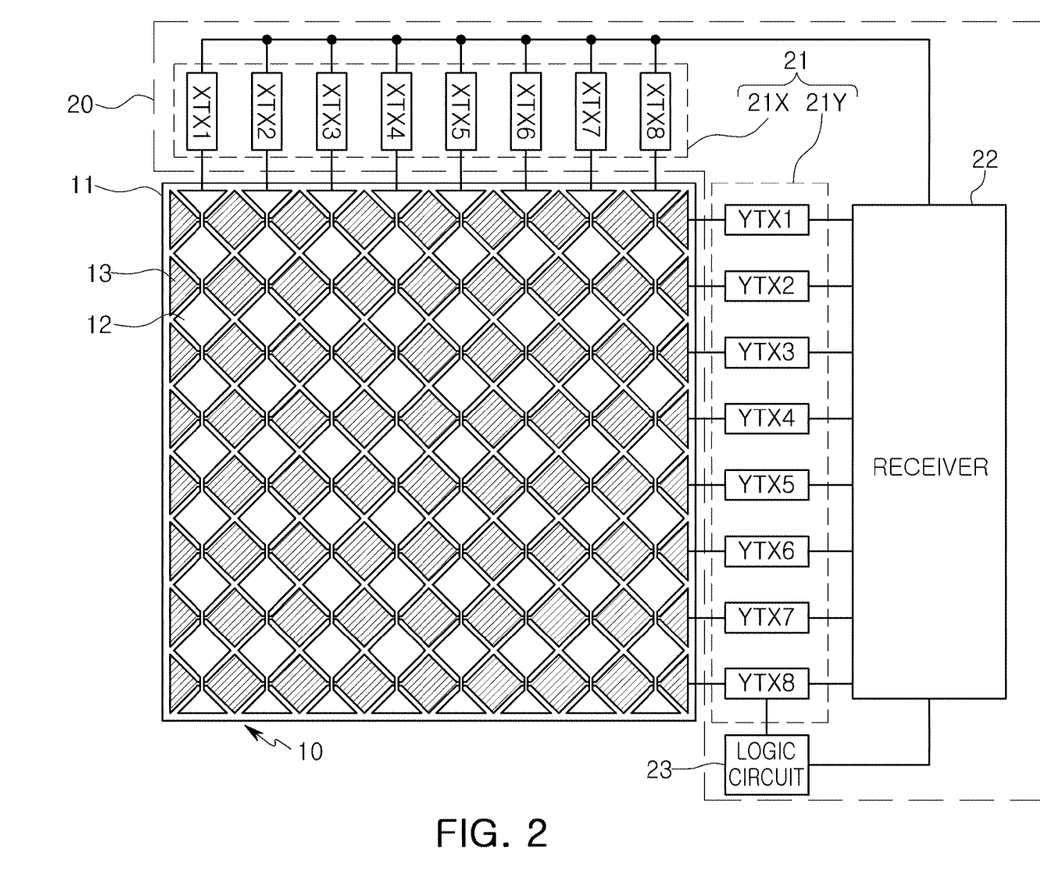

FIGS. 1 and 2 are block diagrams illustrating a touchscreen device including a touch sensor controller according to an exemplary embodiment.

As shown in FIG. 1, a touchscreen device according to an exemplary embodiment may include a touch panel 1 and a touch sensor controller 2. The touch panel 1 may include at least one transparent substrate and a plurality of sensor lines formed on the transparent substrate. At least a portion of the plurality of sensor lines may be extended in different directions to intersect each other. The plurality of sensor lines may be formed using a transparent conductive material such as indium tin oxide (ITO), zinc oxide (ZnO), indium zinc oxide (IZO), carbon nanotubes, or the like, or may be formed using a thin metal fine pattern.

The touch sensor controller 2 may include an analog circuit 3, an analog-to-digital converter (ADC) 4, and a digital circuit 5. The analog circuit 3 may include a charge amplifier for converting a charge generated in sensor lines of the touch panel 1 into a voltage signal to output the voltage signal, a sampling circuit for accumulating or integrating a voltage signal output by the charge amplifier, and the like. Output of the analog circuit 3 may be converted into a digital signal by the analog-to-digital converter 4.

The digital circuit 5 may receive the digital signal transmitted from the analog-to-digital converter 4 to determine coordinates of a touch input, a gesture, and the like. The digital circuit may be provided as a digital signal processor (DSP), or the like. In an exemplary embodiment, at least a portion of components of the touch sensor controller 2 may be provided as a main processor and a single module of an electronic device including a touchscreen device.

Next, in FIG. 2, a touchscreen device according to an exemplary embodiment may include a touch panel 10 and a touch sensor controller 20. The touch panel 10 may include a transparent substrate 11 and a plurality of sensor lines 12 and 13. Sensor lines 12 and 13 may include first sensor lines extended in a longitudinal direction to be used for determining an x-axis coordinate and second sensor lines 13 extended in a transverse direction to be used for determining a y-axis coordinate. The first sensor lines 12 may be electrically isolated from the second sensor lines 13.

In an exemplary embodiment illustrated in FIG. 2, each of the sensor lines 12 and 13 may include a plurality of diamond-shaped unit electrodes connected to each other. However, a shape of each of the sensor lines 12 and 13 is not limited thereto, and may be various other shapes. For example, each of the sensor lines 12 and 13 may have a rectangular bar shape, or a metal fine pattern.

The touch sensor controller 20 may include a transmitter 21, a receiver 22, a logic circuit 23, and the like. The transmitter 21 may include a first transmitter 21X connected to the first sensor lines 12 and a second transmitter 21Y connected to the second sensor lines 13. The first transmitter 21X may output a driving signal to the first sensor lines 12. In an exemplary embodiment, the first transmitter 21X may output a driving signal to the first sensor lines 12 sequentially, or at one time. The first sensor lines 12 may be charged with a charge by the driving signal. In a manner similar thereto, the second transmitter 21Y may output a driving signal to the second sensor lines 13. Driving signals output by the first transmitter 21X and the second transmitter 21Y may be the same as each other or may be different from each other.

The receiver 22, as a circuit for detecting a charge generated in the sensor lines 12 and 13, may include a charge amplifier, a sampling circuit, an integrator, and the like. In an exemplary embodiment illustrated in FIG. 2, the receiver 22 is illustrated as being a single block, but is not limited thereto. In addition, a plurality of receivers 22 may be included in the touch sensor controller 20. In this case, charges generated in the plurality of sensor lines 12 and 13 may be detected by the plurality of receivers 22 at the same time.

The logic circuit 23 may control the transmitter 21 and the receiver 22. The logic circuit 23 may include a timing controller, a calculation circuit, and the like. The logic circuit 23 may adjust timing at which the transmitter 21 outputs a driving signal to the sensor lines 12 and 13, characteristics of a driving signal, and the like, with reference to a main clock period. In addition, the logic circuit 23 may control the receiver 22 to convert a charge generated in the sensor lines 12 and 13 into an analog signal. In an exemplary embodiment, an analog-to-digital converter and a digital circuit, a circuit for determining a touch input from an analog signal, may be included inside the logic circuit 23.

The touch sensor controller 20 according to an exemplary embodiment may be operated in a normal mode or a noise mode according to a magnitude of a noise signal flowing externally. The logic circuit 23 may detect a magnitude of a voltage signal generated from a charge of the sensor lines 12 and 13 by the receiver 22 to determine a magnitude of a noise signal. As a result of the determination, when it is determined that a magnitude of a noise signal is higher than a predetermined reference value, e.g., based on determining that a magnitude of a noise signal is higher than a predetermined reference value, the logic circuit 23 may control the touch sensor controller 20 to operate in a noise mode. When a magnitude of a noise signal is lower than a predetermined reference value, the logic circuit 23 may control the touch sensor controller 20 to operate in a normal mode.

The touch sensor controller 20 may sense a touch input using a mutual-capacitance method in a normal mode. On the other hand, the touch sensor controller 20 may sense a touch input using a self-capacitance method in a noise mode. The touch sensor controller 20 according to an exemplary embodiment may sense a touch input using a noise signal, instead of intentionally removing the noise signal in the noise mode. Thus, in the case of heavy noise coming from an external source, power consumption of the touch sensor controller 20 may be reduced, and a sensing speed of a touch input may be improved.

Figure 3:
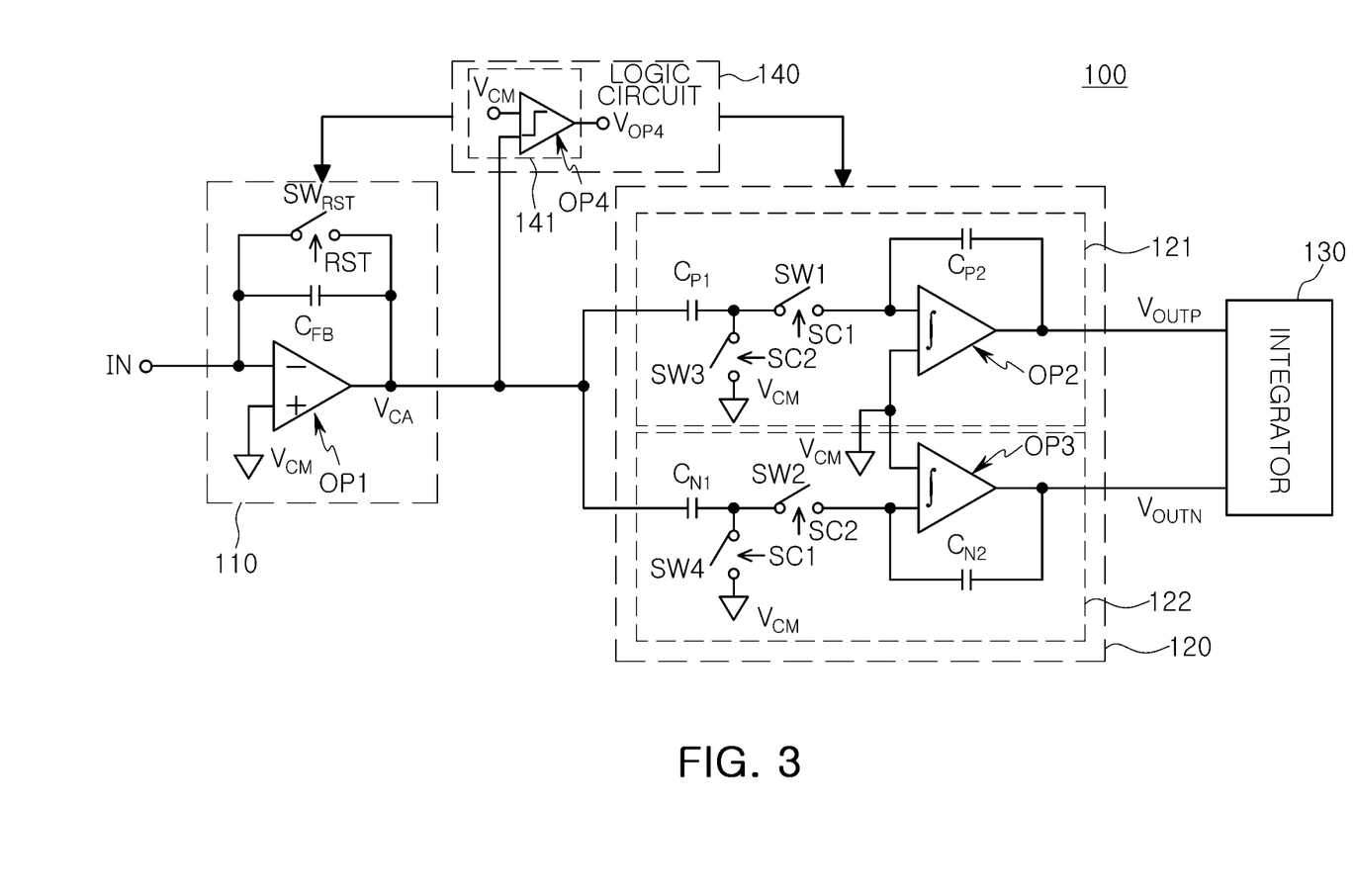
FIGS. 3 and 4 are views illustrating a normal mode operation of a touch sensor controller according to an exemplary embodiment.
Figure 4:
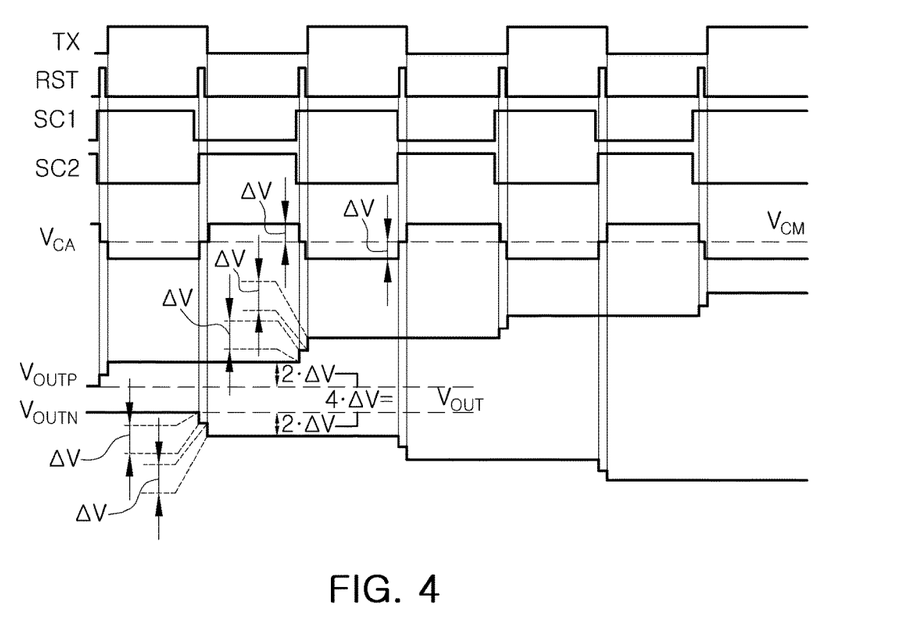

FIGS. 3 and 4 are views illustrating a normal mode operation of a touch sensor controller according to an exemplary embodiment.

First, with reference to FIG. 3, a touch sensor controller 100 according to an exemplary embodiment may include a charge amplifier 110, a sampling circuit 120, an integrator 130, a logic circuit 140, and the like. Operations of the charge amplifier 110, the sampling circuit 120, and the integrator 130 may be controlled by the logic circuit 140.

The charge amplifier 110 may include a first operational amplifier OP1, a feedback capacitor $C_{FB}$, and a reset switch $SW_{RST}$. The feedback capacitor $C_{FB}$ may be connected between an inverting input terminal and an output terminal of the first operational amplifier OP1, and the reset switch $SW_{RST}$ may be connected to the feedback capacitor $C_{FB}$ in parallel. A non-inverting input terminal of the first operational amplifier OP1 may be connected to a predetermined common voltage $V_{CM}$. In an exemplary embodiment, a common voltage $V_{CM}$ may have a magnitude, which is ½ of a magnitude of a power supply voltage VDD input to the touch sensor controller 100.

The sampling circuit 120 may include a first sampler 121 and a second sampler 122. In an exemplary embodiment, sampling circuit 120 including the first sampler 121 and the second sampler 122 may be a correlated double sampler. The first sampler 121 may include a first positive capacitor $C_{P1}$, the second positive capacitor $C_{P2}$, and a second operational amplifier OP2. The logic circuit 140 may control a first switch SW1 and a third switch SW3 to adjust output of the first sampler 121. The first switch SW1 and the third switch SW3 may operate complementarily with each other.

In addition, the second sampler 122 may include a first negative capacitor $C_{N1}$, a second negative capacitor $C_{N2}$, and a third operational amplifier OP3. The logic circuit 140 may control a second switch SW2 and a fourth switch SW4 to adjust output of the second sampler 122. The logic circuit 140 may control the second switch SW2 and the fourth switch SW4 to be operated complementarily with each other.

The integrator 130 may calculate a difference between a positive voltage $V_{OUTP}$ output by the first sampler 121 and a negative voltage $V_{OUTN}$ output by the second sampler 122. In other words, the integrator 130 may calculate a difference between a first output and a second output, where the first output is from the first sampler and the second output is from the second sampler. Since the integrator 130 calculates a difference between the positive voltage $V_{OUTP}$ and the negative voltage $V_{OUTN}$, a low frequency noise signal may be removed.

The logic circuit 140 may control the charge amplifier 110, the sampling circuit 120, and the integrator 130. In an exemplary embodiment, the logic circuit 140 may include a comparison circuit 141 for comparing a voltage signal $V_{CA}$ output by the charge amplifier 110 with the common voltage $V_{CM}$. An operational amplifier OP4 included in the comparison circuit 141 may be operated as a latched comparator. The logic circuit 140 calculates a difference between the voltage signal $V_{CA}$ and the common voltage $V_{CM}$, and may allow the touch sensor controller 100 to be operated in a normal mode when a difference between the voltage signal $V_{CA}$ and the common voltage $V_{CM}$ is less than a predetermined reference value.

In an exemplary embodiment, when a magnitude of a noise signal flowing into the voltage signal $V_{CA}$ is not significant, a change in magnitude of the voltage signal $V_{CA}$ may be defined as representing a touch input. Thus, when a difference between the voltage signal $V_{CA}$ and the common voltage $V_{CM}$ is within the reference value, the logic circuit 140 may determine that a current magnitude of a noise signal is equal to an offset level in the sampling circuit 120, the integrator 130, and the like, and the touch sensor controller 100 may be operated in a normal mode.

In an exemplary embodiment, the logic circuit 140 may control switches SW1 to SW4 and $SW_{RST}$ included in the charge amplifier 110 and the sampling circuit 120. Since the logic circuit 140 controls an on and off state of the switches SW1 to SW4 and $SW_{RST}$, the voltage signal $V_{CA}$ output by the charge amplifier 110 may be reflected in the positive voltage $V_{OUTP}$ output by the first sampler 121 or the negative voltage $V_{OUTN}$ output by the second sampler 122.

In a normal mode, the logic circuit 140 may generate a first switch control signal SC1 and a second switch control signal SC2 to control the first switch SW1 to the fourth switch SW4. In an exemplary embodiment, the first switch SW1 and the fourth switch SW4 are controlled by the first switch control signal SC1, and the second switch SW2 and the third switch SW3 are controlled by the second switch control signal SC2. In other words, the second switch SW2 and the third switch SW3 may be turned on or turned off at the same time, and the first switch SW1 and the fourth switch SW4 may be turned on or turned off at the same time.

Each of the first sampler 121 and the second sampler 122 may alternately sample the voltage signal $V_{CA}$ output by the charge amplifier 110. In a process in which the first sampler 121 generates the positive voltage $V_{OUTP}$ and the second sampler 122 generates the negative voltage $V_{OUTN}$, a high frequency noise signal included in the voltage signal $V_{CA}$ may be removed. In other words, the first sampler 121 may detect the voltage signal $V_{CA}$ based on the voltage signal $V_{CA}$ being greater than a predetermined common voltage $V_{CM}$, and the second sampler 122 may detect the voltage signal $V_{CA}$ based on the voltage signal $V_{CA}$ being less than a predetermined common voltage $V_{CM}$.

In terms of characteristics of a touchscreen device operated while being adjacent to various components of an electronic device, including a display device, noise may flow from various sources to a touch panel and the touch sensor controller 100. As described previously, a high frequency noise signal may be removed in a process in which the sampling circuit 120 generates the positive voltage $V_{OUTP}$ and the negative voltage $V_{OUTN}$, and a low frequency noise signal may be removed in a process in which the integrator 130 calculates a difference between the positive voltage $V_{OUTP}$ and the negative voltage $V_{OUTN}$. Thus, when a magnitude of a noise signal is relatively low, the touch sensor controller 100 may remove a noise signal from the sampling circuit 120 and the integrator 130 while operating in a normal mode, which will be described with reference to FIG. 4.

FIG. 4 is a timing diagram illustrating a case in which the touch sensor controller 100 is operated in a normal mode. With reference to FIG. 4, the feedback capacitor $C_{FB}$ of the charge amplifier 110 may be reset by a reset signal RST for controlling the reset switch $SW_{RST}$ of the charge amplifier 110. In other words, a charge in the feedback capacitor $C_{FB}$ of the charge amplifier 110 may be discharged by the reset signal RST.

When a reset operation of the feedback capacitor $C_{FB}$ is started, the first switch control signal SC1 may be set to a high value (i.e., logic high) and the second switch control signal SC2 may be set to a low value (i.e., logic low). In the touch sensor controller 100 according to an exemplary embodiment illustrated in FIG. 3, the logic circuit 140 may control the first switch SW1 and the fourth switch SW4 using the first switch control signal SC1, and may control the second switch SW2 and the third switch SW3 using the second switch control signal SC2.

While the reset signal RST and the first switch control signal SC1 have high values simultaneously, a charge in the feedback capacitor $C_{FB}$ and the first negative capacitor $C_{N1}$ may be discharged. Thus, the voltage signal $V_{CA}$ output by the charge amplifier 110 may be by $\Delta V$ to the common voltage $V_{CM}$. In addition, as a charge in the first positive capacitor $C_{P1}$ is transferred to the second positive capacitor $C_{P2}$ through the first switch SW1 while turned on, the positive voltage $V_{OUTP}$ may be increased by $\Delta V$.

When the reset signal RST is converted to a low value, a driving signal TX having a high value may be input to sensor lines by a transmitter, e.g., in an exemplary embodiment, a driving signal TX having a high value may be output by the transmitter and received by the sensor lines. The charge amplifier 110 may detect a charge generated in sensor lines of a touch panel using a mutual-capacitance method. A charge in the feedback capacitor $C_{FB}$ of the charge amplifier 110 may be reflected in the positive voltage $V_{OUTP}$ through the first positive capacitor $C_{P1}$ and the second positive capacitor $C_{P2}$. Thus, the positive voltage $V_{OUTP}$ may be increased by $\Delta V$. As a result, while the first switch control signal SC1 has a high value, the positive voltage $V_{OUTP}$ may be increased by $2 \times \Delta V$, a degree of change of the voltage signal $V_{CA}$ output by the charge amplifier 110.

When a half period of the driving signal TX ends, the feedback capacitor $C_{FB}$ of the charge amplifier 110 is reset by the reset signal RST again, whereby the voltage signal $V_{CA}$ output by the charge amplifier 110 may be set to the common voltage $V_{CM}$. While the feedback capacitor $C_{FB}$ is reset, the second switch control signal SC2 is set to a high value, the first positive capacitor $C_{P1}$ is reset together, and a degree of change $\Delta V$ of the voltage signal $V_{CA}$ may be reflected in the negative voltage $V_{OUTN}$.

When a reset operation is completed, a driving signal having a low value may be input to sensor lines (i.e., a driving signal having a love value may be output by the transmitter and received by the sensor lines), and the voltage signal $V_{CA}$ output by the charge amplifier 110 may be sampled by the second sampler 122. Thus, the negative voltage $V_{OUTN}$ may be increased by $\Delta V$. As a result, while the second switch control signal SC2 has a high value, the positive voltage $V_{OUTN}$ may be reduced by 2·ΔV which is a degree of change of the voltage signal $V_{CA}$ output by the charge amplifier 110.

In an exemplary embodiment illustrated in FIG. 4, during the time for which the driving signal TX has a high value, the voltage signal $V_{CA}$ output by the charge amplifier 110 may be detected by the first sampler 121. In addition, during the time for which the driving signal TX has a low value, the voltage signal $V_{CA}$ output by the charge amplifier 110 may be detected by the second sampler 122. In other words, while the touch sensor controller 100 is operated in a normal mode, the first sampler 121 and the second sampler 122 may alternately detect the voltage signal $V_{CA}$ for each half period of the driving signal TX.

The integrator 130 may calculate a difference between the positive voltage $V_{OUTP}$ and the negative voltage $V_{OUTN}$ to generate an analog output signal $V_{OUT}$. In an exemplary embodiment, low frequency noise included in the positive voltage $V_{OUTP}$ and the negative voltage $V_{OUTN}$ may be substantially the same. Thus, in a process in which the integrator 130 calculates a difference between the positive voltage $V_{OUTP}$ and the negative voltage $V_{OUTN}$, a low frequency noise signal may be removed.

Figure 5:
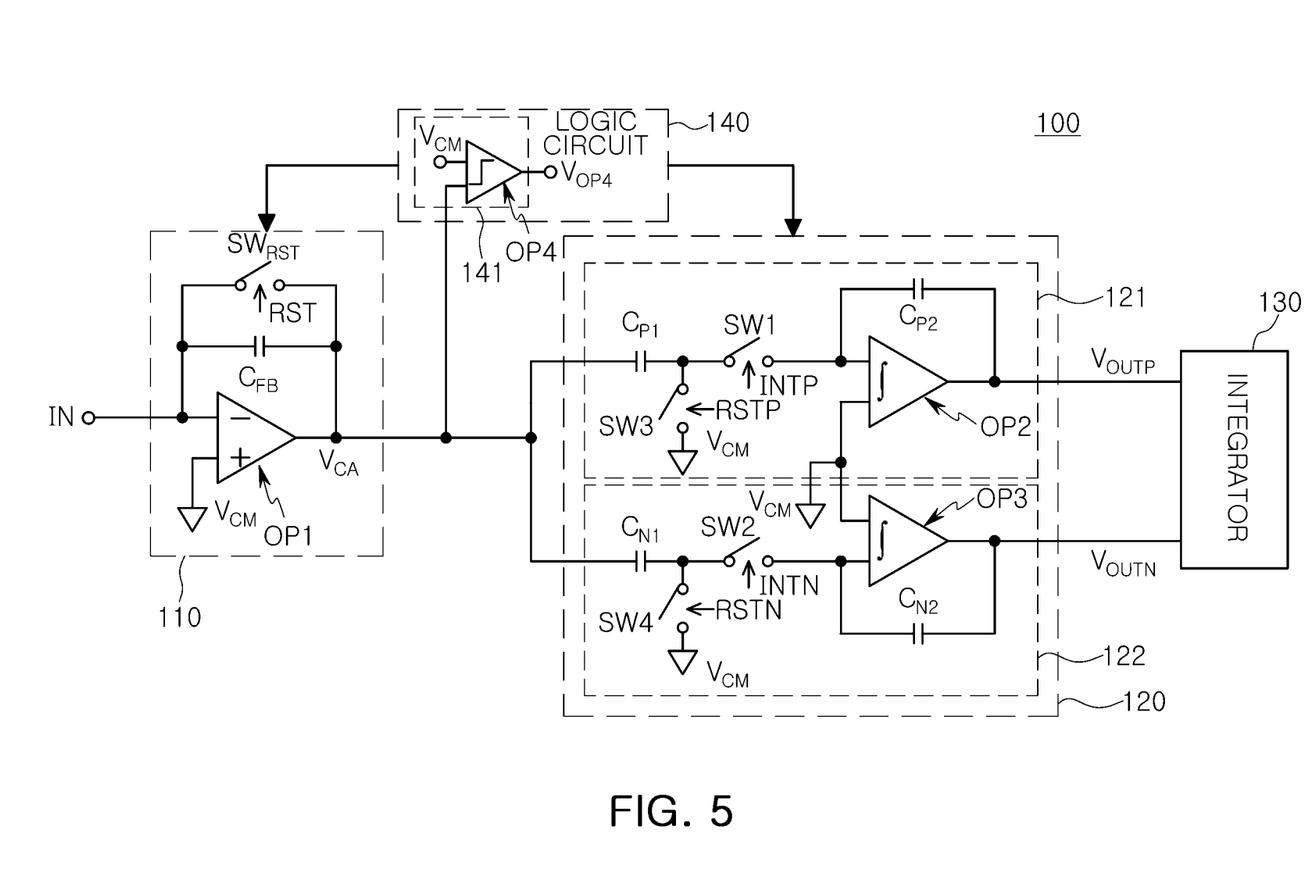
FIGS. 5 and 6 are views illustrating a noise mode operation of a touch sensor controller according to an exemplary embodiment.
Figure 6:
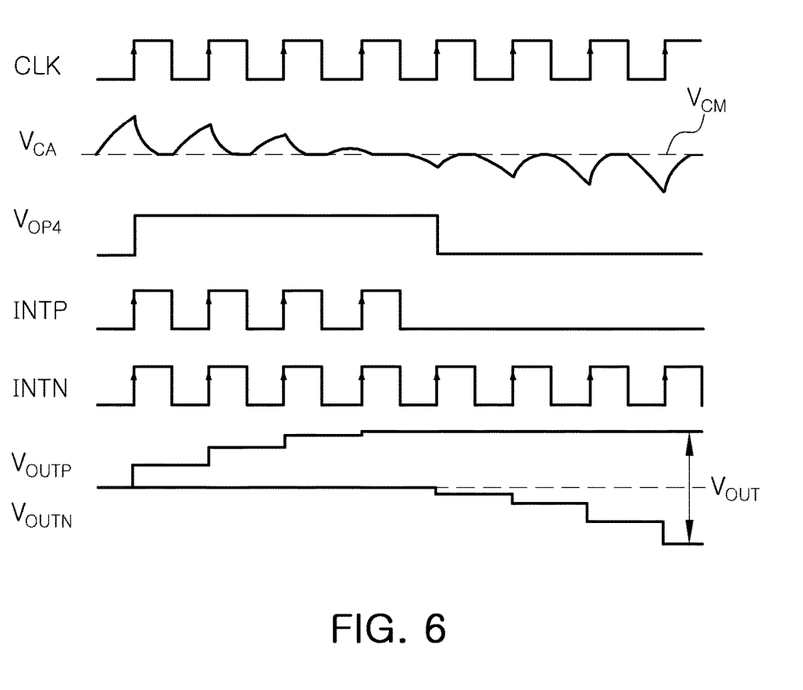

FIGS. 5 and 6 are views illustrating a noise mode operation of a touch sensor controller according to an exemplary embodiment.

First, with reference to FIG. 5, a circuit configuration of the touch sensor controller 100 may be the same as the exemplary embodiment illustrated in FIG. 3. However, as compared to the exemplary embodiment illustrated in FIGS. 3 and 4, a signal for controlling a first switch SW1 to a fourth switch SW4 in an exemplary embodiment illustrated in FIGS. 5 and 6 may be different. In addition, in an exemplary embodiment illustrated in FIGS. 5 and 6, a transmitter may not output a driving signal to sensor lines of a touch panel.

With reference to FIG. 5, in a noise mode, the first switch SW1 may be controlled by a positive integration signal INTP, and the second switch SW2 may be controlled by a negative integration signal INTN. In addition, the third switch SW3 may be controlled by a positive reset signal RSTP, the fourth switch SW4 may be controlled by a negative reset signal RSTN. Thus, in a manner different from the normal mode described with reference to FIGS. 3 and 4, in a noise mode, the first switch SW1 and the fourth switch SW4 may not be turned on or turned off at the same time, and the second switch SW2 and the third switch SW3 may not be turned on or turned off at the same time.

The logic circuit 140 of the touch sensor controller 100 may detect a magnitude of the voltage signal $V_{CA}$ output by the charge amplifier 110 to determine whether the touch sensor controller is operated in a noise mode. For example, the logic circuit 140 may calculate a difference between a magnitude of the voltage signal $V_{CA}$ and a magnitude of the voltage signal $V_{CA}$ output by the charge amplifier 110 in a previous sampling period. When the calculated difference therebetween is higher than a predetermined reference value, the logic circuit 140 determines that a relatively high level of noise signal from an external source is present, thereby allowing the touch sensor controller 100 to be operated in a noise mode, wherein the noise signal can be generated by the external source, not by a general touch or hover operation by a user.

In another exemplary embodiment, the logic circuit 140 may calculate a difference between a magnitude of the voltage signal $V_{CA}$, and a magnitude of a predetermined common voltage $V_{CM}$. When a difference between a magnitude of the voltage signal $V_{CA}$ and a magnitude of the common voltage $V_{CM}$ is higher than a predetermined reference value, the logic circuit 140 may allow the touch sensor controller 100 to be operated in a noise mode. In other words, the logic circuit may control the transmitter to refrain from outputting the driving signal to the sensor lines based on a difference between the voltage signal and a predetermined common voltage being greater than a predetermined reference value. In an exemplary embodiment, magnitudes of the voltage signal $V_{CA}$ and the common voltage $V_{CM}$ may be compared to each other by the comparison circuit 141 included in the logic circuit 140.

When an operation mode of the touch sensor controller 100 is set to a noise mode, the logic circuit 140 may control a transmitter not to input a driving signal to sensor lines (i.e., the logic circuit 140 may control the transmitter to refrain from outputting the driving signal to the sensor lines). In addition, the logic circuit 140 may detect the voltage signal $V_{CA}$ output by the charge amplifier 110 for each period of a main clock signal to determine a sign of a noise signal. The sign of the noise signal may be determined as being either positive (+) or negative (−). The logic circuit may control the transmitter to refrain from outputting the driving signal to the sensor lines based on a difference between the voltage signal and a previous voltage signal output by the charge amplifier in a previous sampling period being greater than a predetermined threshold value.

In an exemplary embodiment, when a magnitude of the voltage signal $V_{CA}$ is higher than a magnitude of the voltage signal $V_{CA}$ detected in a previous sampling period, the logic circuit 140 may determine that a sign of a noise signal is positive. On the contrary, when a magnitude of the voltage signal $V_{CA}$ is lower than a magnitude of the voltage signal $V_{CA}$ detected in a previous sampling period, the logic circuit 140 may determined that a sign of a noise signal is negative.

In a different exemplary embodiment, when a magnitude of the voltage signal $V_{CA}$ is higher than a magnitude of the common voltage $V_{CM}$, the logic circuit 140 may determine that a sign of a noise signal is positive. In this case, when a magnitude of the voltage signal $V_{CA}$ is lower than a magnitude of the common voltage $V_{CM}$, the logic circuit 140 may determine that a sign of a noise signal is negative.

In an exemplary embodiment illustrated in FIGS. 5 and 6, the logic circuit 140 may compare the voltage signal $V_{CA}$ to the common voltage $V_{CM}$ to determine a sign of a noise signal. As shown in an exemplary waveform graph of FIG. 6, voltage signals $V_{CA}$ during four initial periods of a main clock signal are higher than the common voltage $V_{CM}$, and thus, an output signal $V_{OP4}$ of the comparison circuit 141 may have a high value. While the high value of the output signal $V_{OP4}$ of the comparison circuit 141 is maintained, the logic circuit 140 may be synchronized with a main clock signal to output a positive integration signal INTP having a high value. At the same time, the logic circuit 140 may maintain the negative integration signal INTN to have a low value. Thus, a noise signal and a voltage signal $V_{CA}$ generated from a touch input may be reflected in the positive voltage $V_{OUTP}$ output by the first sampler 121.

While the touch sensor controller is operated in a noise mode, when the voltage signal $V_{CA}$ is lower than the common voltage $V_{CM}$, the output signal $V_{OP4}$ of the comparison circuit 141 may have a low value. While the low value of the output signal $V_{OP4}$ of the comparison circuit 141 is maintained, the logic circuit 140 may be synchronized with a main clock signal to output a negative integration signal INTN having a high value. At the same time, the logic circuit 140 may maintain the positive integration signal INTP to have a low value. Thus, a noise signal and a voltage signal $V_{CA}$ generated from a touch input may be reflected in the negative voltage $V_{OUTN}$.

The integrator 130 may calculate a difference between the positive voltage $V_{OUTP}$ and the negative voltage $V_{OUTN}$ to generate the analog output signal $V_{OUT}$. When the analog output signal $V_{OUT}$ is transmitted to the analog-to-digital converter, the logic circuit 140 allows the third switch SW3, the fourth switch SW4, and the reset switch $SW_{RST}$ to be turned on so as to reset capacitors included in the charge amplifier 110 and the sampling circuit 120.

Figure 7:
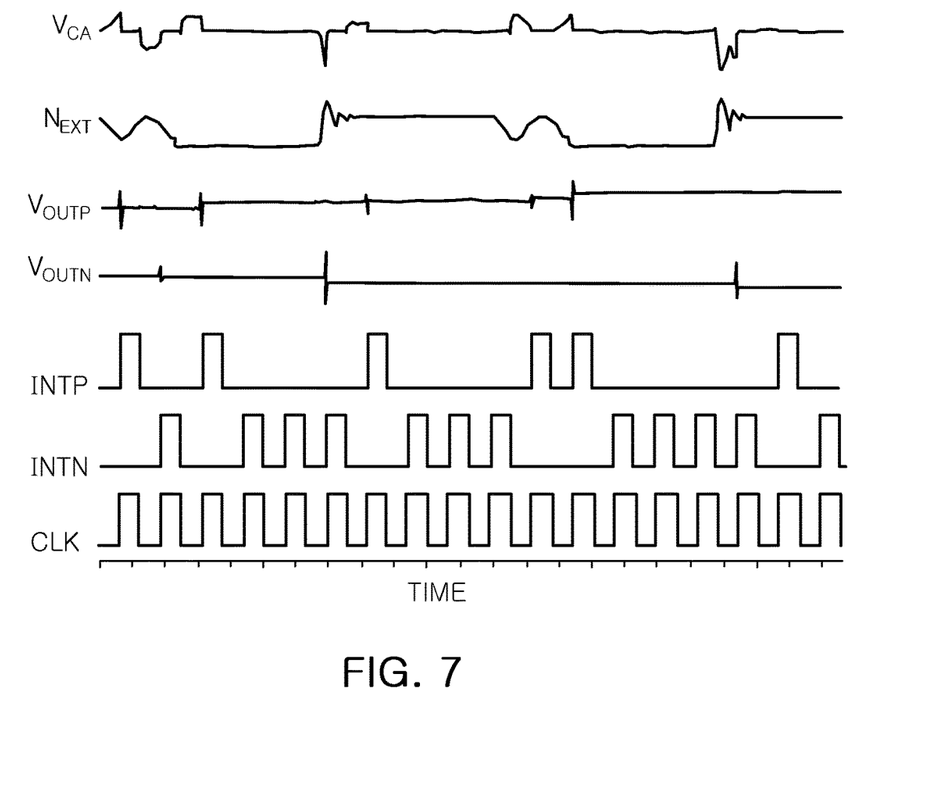
FIGS. 7 and 8 are waveform diagrams illustrating simulation results of a touch sensor controller according to an exemplary embodiment.
Figure 8:
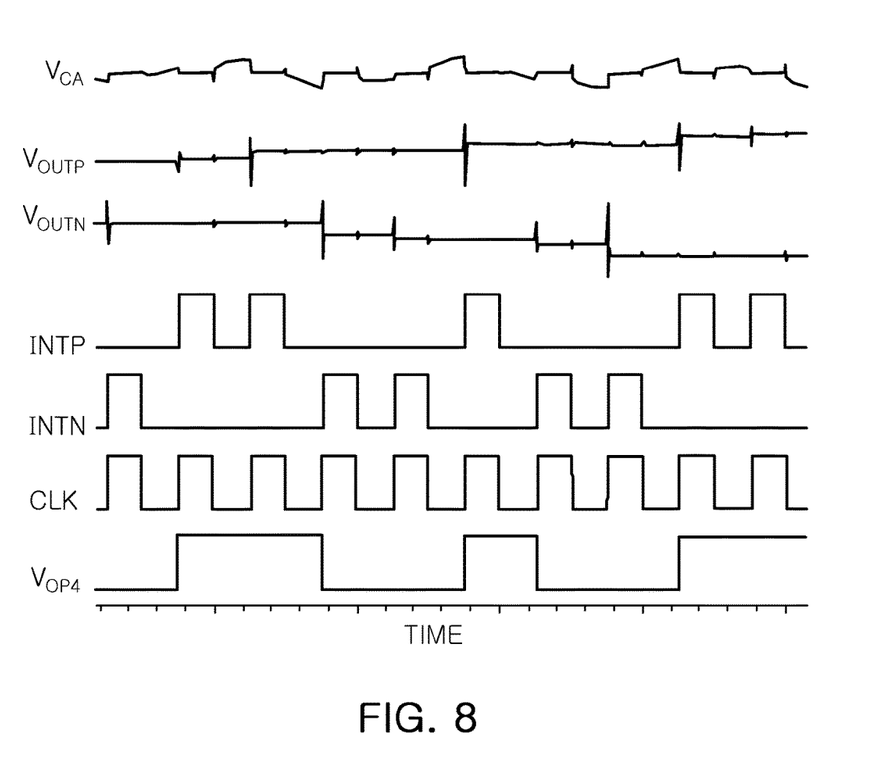

FIGS. 7 and 8 are waveform diagrams illustrating simulation results of the touch sensor controller according to an exemplary embodiment illustrated in FIG. 5. An exemplary embodiment illustrated in FIG. 7 may correspond to a case in which a charge noise signal enters a touch panel, and an exemplary embodiment illustrated in FIG. 8 may correspond to a case in which a noise signal in the form of a sine wave enters a touch panel.

First, with reference to FIG. 7, a magnitude of the voltage signal $V_{CA}$ output by the charge amplifier 110 may be varied by a noise signal $N_{EXT}$ coming from an external source. The logic circuit 140 may compare the voltage signal $V_{CA}$, to which the noise signal $N_{EXT}$ is reflected in the common voltage $V_{CM}$, to generate a positive integration signal INTP and a negative integration signal INTN. The logic circuit 140 may generate the positive integration signal INTP and the negative integration signal INTN to be synchronized with a main clock signal CLK.

When the positive integration signal INTP has a high value, the voltage signal $V_{CA}$ may be output by the charge amplifier 110 and input into the first sampler 121. In addition, when the negative integration signal INTN has a high value, the voltage signal $V_{CA}$ may be output by the charge amplifier 110 and input into the second sampler 122. Thus, the voltage signal $V_{CA}$ may be detected by either the first sampler or the second sampler based on the sign of the noise signal. Each of the first sampler 121 and the second sampler 122 accumulates the voltage signal $V_{CA}$ to be reflected in the positive voltage $V_{OUTP}$ and the negative voltage $V_{OUTN}$. The first sampler 121 and the second sampler 122 may output the positive voltage $V_{OUTP}$ and the negative voltage $V_{OUTN}$ to the integrator 130, after the predetermined integration time elapses. The integrator 130 may calculate a difference between the positive voltage $V_{OUTP}$ and the negative voltage $V_{OUTN}$ to be transmitted to the analog-to-digital converter.

Next, with reference to FIG. 8, the output signal $V_{OP4}$ of the comparison circuit 141 included in the logic circuit 140 is illustrated. When a noise signal is higher than a common voltage $V_{CM}$, the output signal $V_{OP4}$ of the comparison circuit 141 may have a high value. In addition, when a noise signal is lower than the common voltage $V_{CM}$, the output signal thereof may have a low value. As the logic circuit 140 generates the positive integration signal INTP and the negative integration signal INTN according to the output signal $V_{OP4}$ of the comparison circuit 141, the voltage signal $V_{CA}$ of the charge amplifier 110 may be accumulated in either the positive voltage $V_{OUTP}$ of the first sampler 121 or the negative voltage $V_{OUTN}$ of the second sampler 122. In a manner similar to the exemplary embodiment illustrated in FIG. 7, the positive integration signal INTP and the negative integration signal INTN may be synchronized with a main clock signal.

Since the positive integration signal INTP and the negative integration signal INTN are synchronized with the main clock signal, it may be determined that the predetermined integration time elapses without a separate clock signal. When a noise signal having a frequency lower than that of a main clock signal is introduced, as the positive integration signal INTP and the negative integration signal INTN are synchronized with a main clock signal, a sign of the noise signal may be accurately determined. On the other hand, when a frequency of a noise signal is higher than a frequency of a main clock signal, as a sign of a noise signal may be changed several times during one period of a main clock signal, a noise signal may not be accurately reflected in the positive voltage $V_{OUTP}$ and the negative voltage $V_{OUTN}$. To solve the problem described above, a separate sampling clock signal, to which a sign and a frequency of a noise signal are reflected, may be generated.

Figure 9:
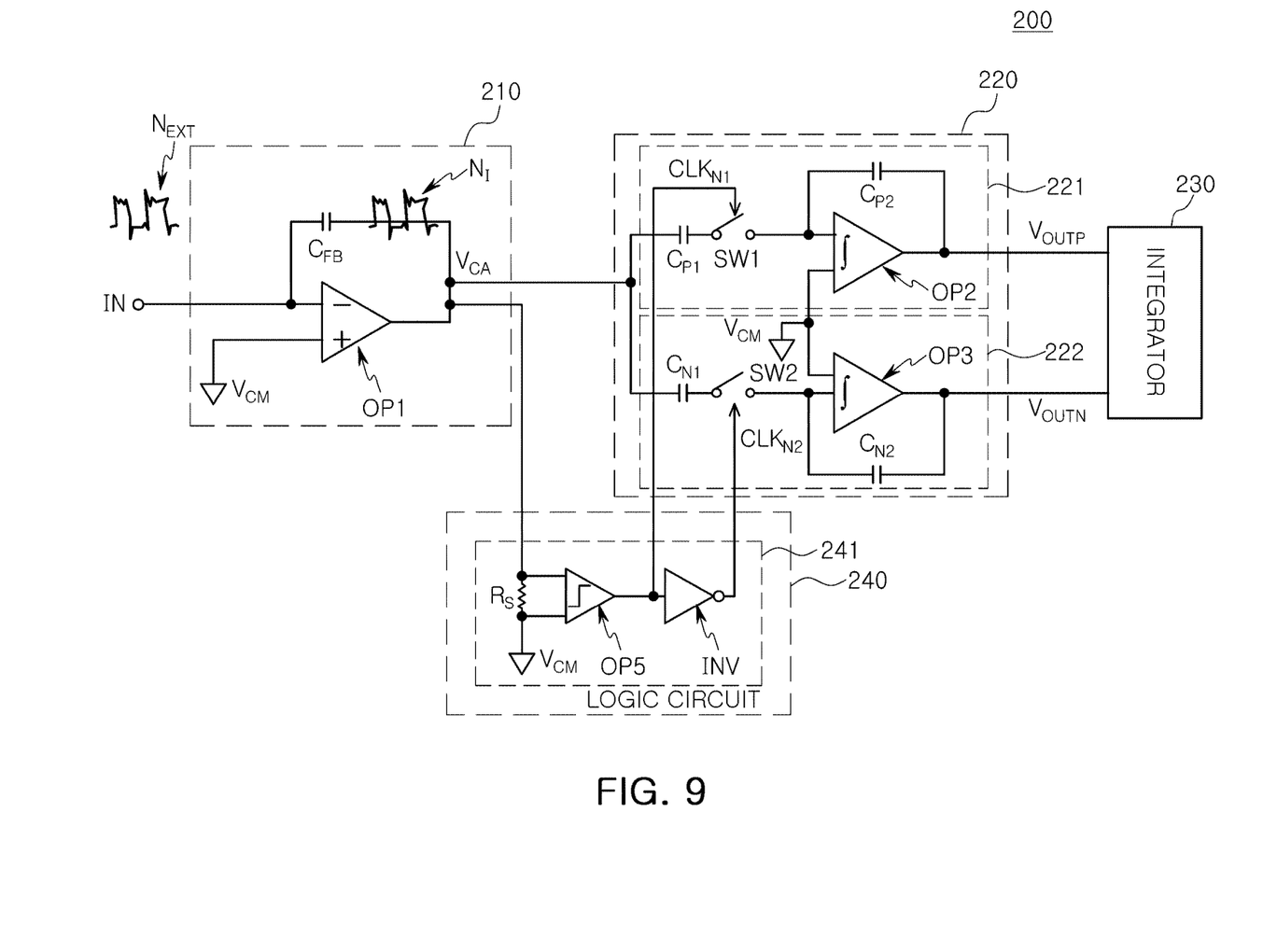
FIG. 9 is a circuit diagram illustrating a touch sensor controller according to an exemplary embodiment.
Figure 10:
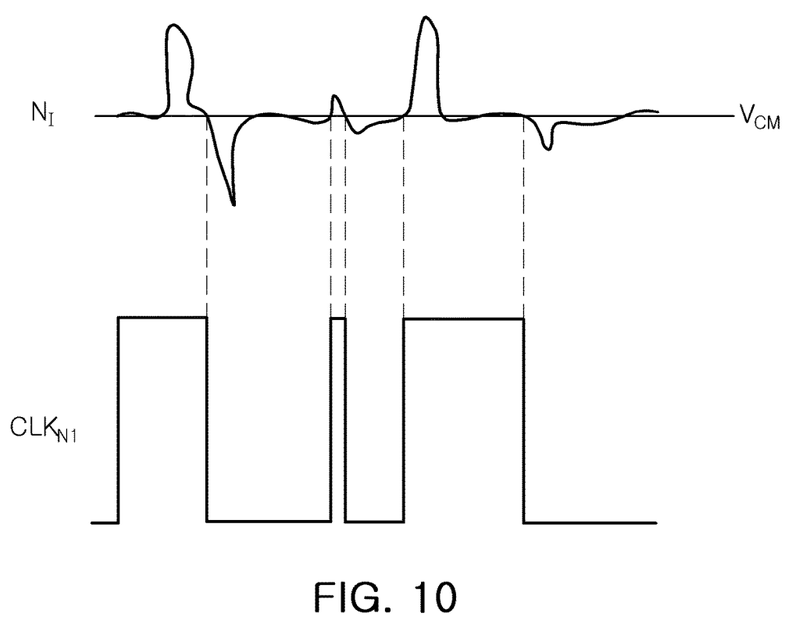
FIG. 10 is a waveform diagram illustrating operations of the touch sensor controller illustrated in FIG. 9.

FIG. 9 is a circuit diagram illustrating a touch sensor controller according to an exemplary embodiment, and FIG. 10 is a view illustrating an operation of the touch sensor controller illustrated in FIG. 9. In an exemplary embodiment illustrated in FIGS. 9 and 10, a frequency of a main clock signal of a touch sensor controller 200 may be lower than a frequency of a noise signal.

First, with reference to FIG. 9, the touch sensor controller 200 may include a charge amplifier 210, a sampling circuit 220, an integrator 230, a logic circuit 240, and the like. A configuration, an operation method, and the like, of the charge amplifier 210, the sampling circuit 220, and the integrator 230 may be similar to those described with reference to FIGS. 3 and 5.

The logic circuit 240 may include a clock generation circuit 241 for generating a sampling clock signal. The clock generation circuit 241 may include an operational amplifier OP5 operated as a comparator, a current detection resistor $R_S$, an inverter INV, and the like. One of input terminals of the operational amplifier OP5 may be connected to the common voltage $V_{CM}$, and the other of the input terminals may be connected to an output terminal of the charge amplifier 210. In other words, the operational amplifier OP5 compares the noise signal $N_I$ included in the voltage signal $V_{CA}$ output by the charge amplifier 210 to the common voltage $V_{CM}$ to generate a sampling clock signal. The second switch SW2 included in a first sampler 221 may be controlled by a sampling clock signal, and the third switch SW3 included in a second sampler 222 may be controlled by a signal in which a sampling clock signal is inverted by the inverter INV. In other words, the second switch SW2 and the third switch SW3 may be turned on or turned off by signals in a complementary relationship with each other.

With reference to FIG. 9, an external noise signal $N_{EXT}$ is introduced through an input terminal IN of the charge amplifier 210, and the noise signal $N_I$ may be generated in the charge amplifier 210 by the external noise signal $N_{EXT}$. The noise signal $N_I$ reflected in the charge amplifier 210 may be a current signal, and may be reflected in the voltage signal $V_{CA}$ output by the charge amplifier 210. The clock generation circuit 241 may compare a voltage magnitude of the noise signal $N_I$ to the common voltage $V_{CM}$ using the current detection resistor $R_S$, and may generate sampling clock signals $CLK_{N1}$ and $CLK_{N2}$ according to the result.

FIG. 10 is a waveform diagram illustrating a method for generating a sampling clock signal. With reference to FIG. 10, the clock generation circuit 241 compares a voltage magnitude of the noise signal $N_I$ to the common voltage $V_{CM}$ to generate a first sampling clock signal $CLK_{N1}$. When a voltage of the noise signal $N_I$ is higher than the common voltage $V_{CM}$, the first sampling clock signal $CLK_{N1}$ may have a high value. In addition, when a voltage of the noise signal $N_I$ is lower than the common voltage $V_{CM}$, the first sampling clock signal may have a low value. Meanwhile, since the first sampling clock signal $CLK_{N1}$ is inverted using the inverter INV, the clock generation circuit 241 may generate a second sampling clock signal $CLK_{N2}$.

The first switch SW1 included in the first sampler 221 may be controlled by the first sampling clock signal $CLK_{N1}$, and the second switch SW2 included in the second sampler 222 may be controlled by the second sampling clock signal $CLK_{N2}$. Since the first sampling clock signal $CLK_{N1}$ and the second sampling clock signal $CLK_{N2}$ are in a complementary relationship with each other, when the first switch SW1 is turned on, the second switch SW2 may be turned off. Alternatively, when the first switch SW1 is turned off, the second switch SW2 may be turned on.

The first sampling clock signal $CLK_{N1}$ and the second sampling clock signal $CLK_{N2}$ may be signals generated by a comparison result of the noise signal $N_I$ detected in an output terminal of the charge amplifier 210 and the common voltage $V_{CM}$ regardless of main clock signal of the logic circuit 240. In an exemplary embodiment, the first sampling clock signal $CLK_{N1}$ and the second sampling clock signal $CLK_{N2}$ may have frequencies different from that of a main clock signal. Thus, even when the noise signal $N_I$ entering the charge amplifier 210 through sensor lines of a touch panel has a frequency higher than that of a main clock signal, a change in the voltage signal $V_{CA}$ according to a sign of the noise signal $N_I$ may be accurately reflected in the positive voltage $V_{OUTP}$ or the negative voltage $V_{OUTN}$.

Figure 11A:
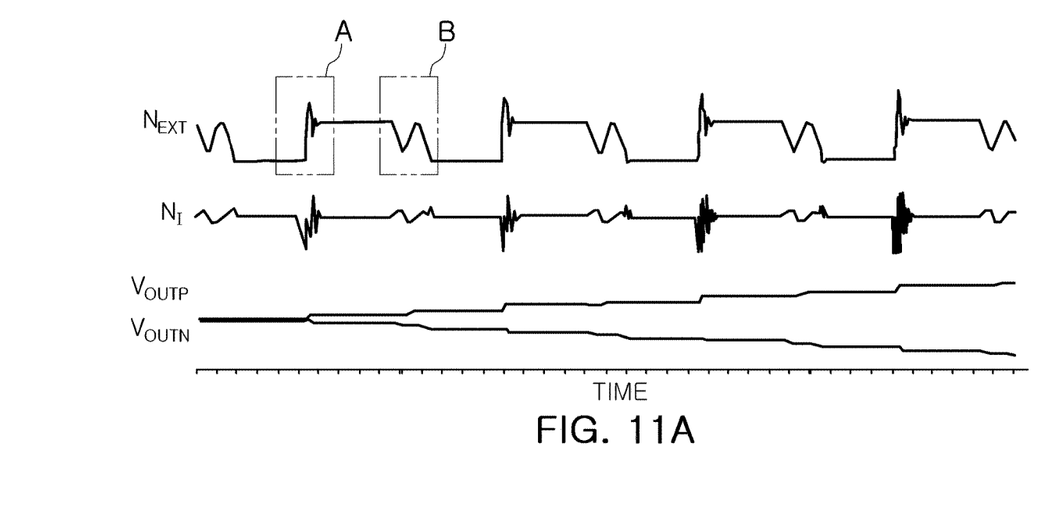
FIGS. 11A, 11B, and 11C are waveform diagrams illustrating simulation results of the touch sensor controller illustrated in FIG. 9.
Figure 11B:
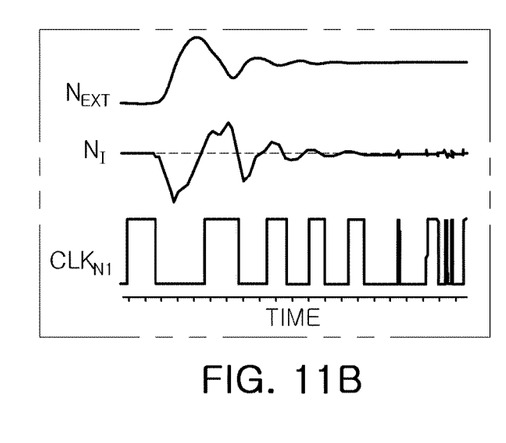
Figure 11C:
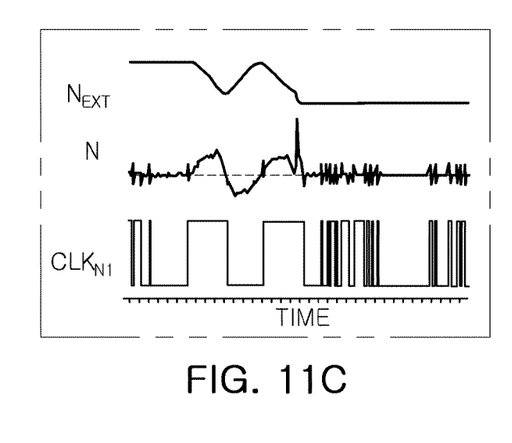

FIGS. 11A to 11C are waveform diagrams illustrating simulation results of the touch sensor controller illustrated in FIG. 9.

With reference to FIG. 11A, an external noise signal $N_{EXT}$ entering the input terminal IN of the charge amplifier 210 through sensor lines of a touch panel, a noise signal $N_I$ detected in the voltage signal $V_{CA}$ output by the charge amplifier 210 due to the external noise signal $N_{EXT}$ as well as the positive voltage $V_{OUTP}$ and the negative voltage $V_{OUTN}$ output by the sampling circuit 220 are illustrated. In an exemplary embodiment illustrated in FIG. 11A, a frequency of the external noise signal $N_{EXT}$ may be higher than a frequency of a main clock signal of the touch sensor controller 200.

With reference to FIG. 11B, which is an enlarged view of section A of FIG. 11A, depending on a magnitude relationship between the noise signal $N_I$ detected in an output terminal CAOUT of the charge amplifier 210 and the common voltage $V_{CM}$, the first sampling clock signal $CLK_{N1}$ may be determined. The first sampling clock signal $CLK_{N1}$ may not have constant periodicity, unlike a main clock signal, and may be synchronized with the external noise signal $N_{EXT}$ to have a variable frequency. Meanwhile, in FIG. 11C, which is an enlarged view of section B of FIG. 11A, the first sampling clock signal $CLK_{N1}$ may represent aperiodicity, and may have a variable frequency synchronized with the external noise signal $N_{EXT}$.

Figure 12:
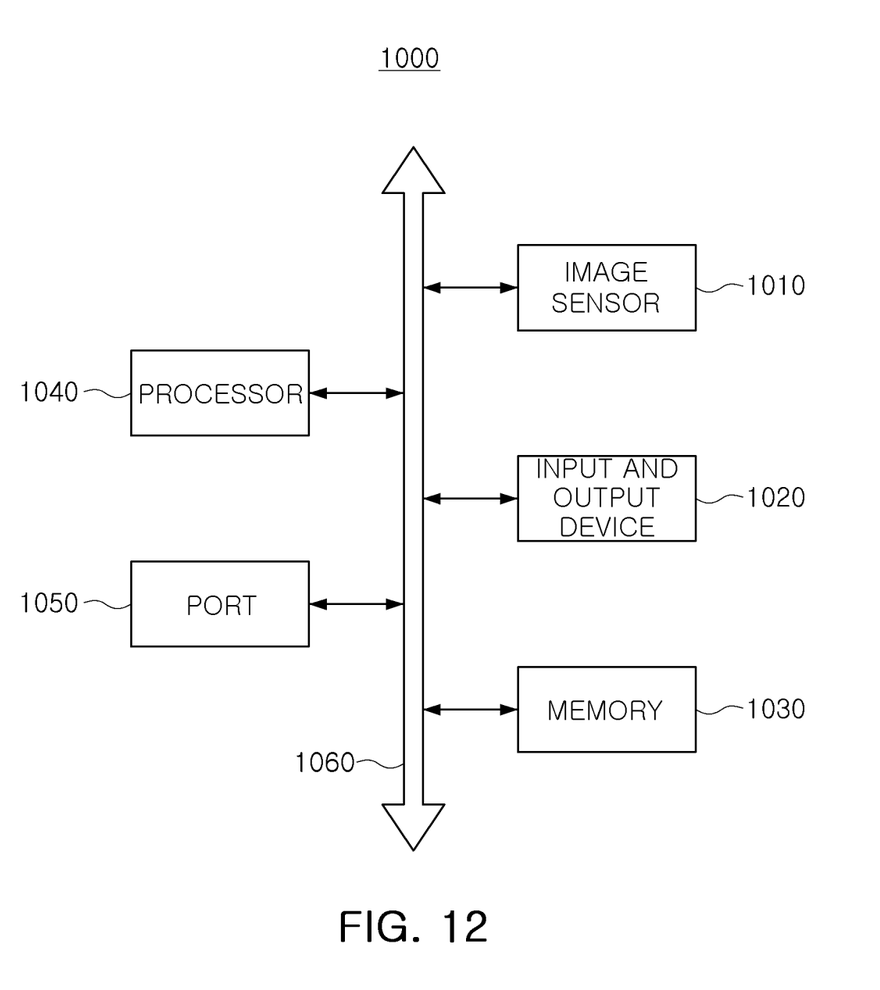
FIG. 12 is a view illustrating an electronic device to which a touch sensor controller according to an exemplary embodiment is applied.

FIG. 12 is a view illustrating an electronic device to which a touch sensor controller according to an exemplary embodiment may be applied.

With reference to FIG. 12, an image sensor 1010 according to an exemplary embodiment may be applied to a computer device 1000. The computer device 1000 according to an exemplary embodiment illustrated in FIG. 12 may include an input and output device 1020, a memory 1030, a processor 1040, a port 1050, and the like, in addition to the image sensor 1010. Furthermore, the computer device 1000 may include a wired and/or wireless communications device, a power supply device, and the like. Among components illustrated in FIG. 12, the port 1050 may be a device provided for allowing the computer device 1000 to communicate with a video card, a sound card, a memory card, a Universal Serial Bus (USB) device, and the like. The computer device 1000 may be a comprehensive concept of all of smartphones, tablet PCs, smart wearable devices, and the like, in addition to typical desktop computers or laptop computers.

The processor 1040 may perform a specific operation, a command, a task, and the like. The processor 1040 may be a central processing unit (CPU) or a microprocessor unit (MCU), and may communicate with the memory 1030, the input and output device 1020, and other devices connected to the image sensor 1010 and the port 1050 through a bus 1060.

The memory 1030 may be a storage medium, storing data required for operations of the computer device 1000, multimedia data, or the like. The memory 1030 may include a volatile memory such as a random access memory (RAM), or a non-volatile memory such as a flash memory, or the like. In addition, the memory 1030 may include at least one of a solid-state drive (SSD), a hard disk drive (HDD), and an optical drive (ODD), as a storage device.

The input and output device 1020 may include an input device such as a keyboard, a mouse, a touchscreen, and the like, provided for a user as well as an output device such as a display, an audio output unit, and the like. A touchscreen is attached to the front of the display to provide a touch input environment for a user.

The touchscreen included in the input and output device 1020 may include a touch sensor controller according to the various exemplary embodiments described previously. In an exemplary embodiment, a touch sensor controller may be operated in a normal mode or a noise mode according to a magnitude of a noise signal. When a magnitude of a noise signal is relatively strong, the touch sensor controller may be operated in a noise mode and may detect a touch input using a self-capacitance method, whereby the detection speed of the touch input may be increased and power consumption may be reduced. A portion of components included in a touch sensor controller may be provided as the processor 1040 and a single module according to an exemplary embodiment.

The image sensor 1010 may be connected to the processor 1040 by the bus 1060 or other communication devices. The image sensor 1010 converts light coming from an external source into an electrical signal to provide the electrical signal for the processor 1040, and the processor 1040 may use the electrical signal to generate image data.

As set forth above, according to exemplary embodiments of the present inventive concept, when a magnitude of a noise signal is significant (i.e., higher than a threshold value), a touch sensor controller may be operated in a noise mode. In the noise mode, the touch sensor controller may block a driving signal from being input into a sensor line, and may sense a touch input using a self-capacitance method by using a noise signal. Thus, a sensing speed of a touch input may be improved, and low power operations may be implemented.

While exemplary embodiments have been shown and described above, it will be apparent to those skilled in the art that modifications and variations could be made without departing from the scope of the present disclosure, as defined by the appended claims.

What is claimed is:

1. A touch sensor controller, comprising:
   a transmitter configured to output a driving signal to sensor lines of a touch panel;
   a charge amplifier configured to generate and output a voltage signal by using a charge generated in the sensor lines;
   a sampling circuit comprising a first sampler and a second sampler for detecting the voltage signal; and
   a logic circuit configured to:
      determine whether the transmitter is operating according to a magnitude of a noise signal included in the voltage signal, and
      based on an operation of the transmitter being interrupted, control one of the first sampler and the second sampler to sample the voltage signal according to a sign of the noise signal.

2. The touch sensor controller of claim 1, wherein the logic circuit is further configured to:
   control the first sampler to detect the voltage signal, based on the sign of the noise signal being positive (+), and
   controls the second sampler to detect the voltage signal, based on the sign of the noise signal being negative (−).

3. The touch sensor controller of claim 1, wherein the logic circuit is further configured to control the transmitter to refrain from outputting the driving signal to the sensor lines, based on a difference between the voltage signal and a predetermined common voltage being greater than a predetermined reference value.

4. The touch sensor controller of claim 3, wherein the logic circuit is further configured to:
   control the first sampler to detect the voltage signal, based on the voltage signal being greater than the predetermined common voltage, and
   control the second sampler to detect the voltage signal, based on the voltage signal being less than the predetermined common voltage.

5. The touch sensor controller of claim 1, wherein the charge amplifier is further configured to convert the charge into the voltage signal for each predetermined sampling period.

6. The touch sensor controller of claim 5, wherein the logic circuit is further configured to control the transmitter to refrain from outputting the driving signal to the sensor lines, based on a difference between the voltage signal and a previous voltage signal output by the charge amplifier in a previous sampling period being greater than a predetermined threshold value.

7. The touch sensor controller of claim 6, wherein the logic circuit is further configured to control the first sampler to detect the voltage signal, based on the voltage signal being greater than the previous voltage signal output by the charge amplifier in the previous sampling period, and
   control the second sampler to detect the voltage signal, based on the voltage signal being less than the previous voltage signal output by the charge amplifier in the previous sampling period.

8. The touch sensor controller of claim 1, wherein the logic circuit comprises a comparison circuit configured to compare the magnitude of the noise signal included in the voltage signal with a predetermined reference value.

9. The touch sensor controller of claim 1, wherein the logic circuit is further configured to control the first sampler and the second sampler to alternatively detect the voltage signal based on the transmitter inputting the driving signal to the sensor lines.

10. The touch sensor controller of claim 1, wherein the logic circuit is further configured to, based on the operation of the transmitter being interrupted, generate:
    a positive integration signal having (i) a high logic value when a sign of the noise signal is positive (+), and (ii) a low logic value when the sign of the noise signal is negative (−), and
    a negative integration signal having (i) the low logic value when the sign of the noise signal is positive (+), and (ii) the high logic value when the sign of the noise signal is negative (−).

11. The touch sensor controller of claim 10, wherein the first sampler is configured to detect the voltage signal while the positive integration signal has the high logic value, and
    wherein the second sampler is configured to detect the voltage signal while the negative integration signal has the high logic value.

12. The touch sensor controller of claim 10, wherein the positive integration signal and the negative integration signal are synchronized with a main clock signal of the logic circuit.

13. The touch sensor controller of claim 1, wherein the logic circuit is configured to:
    generate a first sampling clock signal and a second sampling clock signal based on the sign and a frequency of the noise signal, and
    control the first sampler and the second sampler using the first sampling clock signal and the second sampling clock signal.

* * * * *